United States Patent

Mencacci

[15] 3,666,177
[45] May 30, 1972

[54] SELF PROPELLED, FAN-TYPE ORCHARD SPRAYER

[72] Inventor: Samuel Alfred Mencacci, Antwerp, Belgium

[73] Assignee: International Machinery Corporation, S.A., St. Niklaas-Waas, Belgium

[22] Filed: Apr. 9, 1970

[21] Appl. No.: 27,017

[30] Foreign Application Priority Data

Feb. 25, 1970 Belgium..................................49,936

[52] U.S. Cl...............................................239/77, 239/157
[51] Int. Cl. .....................................................A01n 17/08
[58] Field of Search....................239/77, 191, 212, 237, 157; 60/19

[56] References Cited

UNITED STATES PATENTS

| | | | |
|---|---|---|---|
| 3,135,087 | 6/1964 | Ebert | 60/19 |
| 3,361,354 | 1/1968 | Johnston | 239/157 X |
| 3,529,772 | 9/1970 | Brodersen | 239/157 |
| 3,533,230 | 10/1970 | Draper | 60/19 |
| 1,869,384 | 8/1932 | MacLachlan | 239/224 |
| 1,974,538 | 9/1934 | Johnston | 239/77 X |
| 3,472,454 | 10/1969 | Blue et al | 239/77 |

Primary Examiner—Lloyd L. King
Attorney—Francis W. Anderson

[57] ABSTRACT

The invention pertains to a single-engined, self propelled sprayer wherein the fan speed can be pre-set at the optimum value for the job at hand, while the ground speed of the sprayer can be varied at will by the operator, during spraying.

5 Claims, 4 Drawing Figures

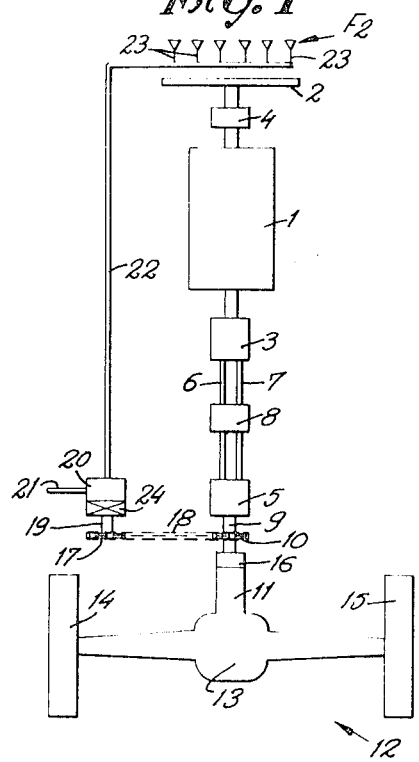
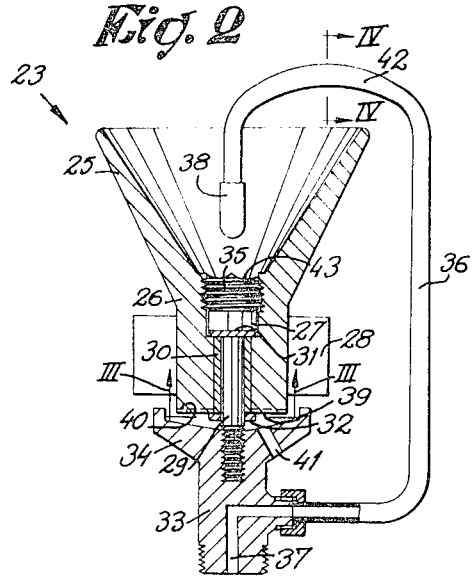
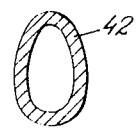
Fig. 1
Fig. 3
Fig. 2
Fig. 4

SELF PROPELLED, FAN-TYPE ORCHARD SPRAYER

The present invention relates to orchard sprayers of the type wherein an air blast is used to convey finely divided liquid drops onto trees, shrubs and the like. In the use of such sprayers, it has been found that a good spraying could be obtained only when the speed of the fan was kept constant, irrespective of the ground speed during spraying. This can be achieved by providing an engine for the fan independent of the propulsion of the sprayer. Thus, tractor drawn sprayers having a fan engine and self propelled sprayers having fan and propulsion engines have already been proposed and widely used.

When considering self propelled sprayers, the provision of two distinct engines is expensive.

It is an object of this invention to provide a single-engined, self propelled sprayer wherein the fan speed can be pre-set at the optimum value for the job at hand, while the ground speed of the sprayer can be varied at will by the operator, during spraying.

It is another object of the invention to provide for a liquid feed, to nozzles located in the air blast, proportional to the ground speed of the sprayer.

It will readily be seen that these combined objects provide the very best spraying arrangement that can presently be conceived, for what concerns both performance and economy of construction and operation.

This economy, associated with outstanding performance, is of particular value in the field of small size sprayers, especially useful to small to medium sized farms.

These objects are met according to the invention by a self propelled sprayer comprising an engine, a fan driven by said engine, a hydrostatic drive also driven by said engine and driving drive wheels for said sprayers.

The hydraulic drive comprises a variable capacity pump, driven by said engine and feeding a hydraulic motor, itself driving an axle assembly for the drive wheels of the sprayer. This configuration according to the invention allows to pre-set the engine speed at the optimum value for the fan and, said speed remaining constant, to vary the ground speed of the sprayer by controlling the capacity of said hydraulic pump.

The advantages of such a configuration would be lost in the absence of adequate liquid metering and spraying means, these being of utmost importance when high concentrate solutions are to be sprayed.

Therefore, still according to the invention, an adjustable, variable capacity metering pump is driven from said hydraulic motor, and feeds liquid to a set of nozzles located in the air blast generated by said fan. In this manner, the quantity of liquid delivered by the pump can be preset at any desired value by adjusting the capacity of the pump, the latter being driven proportionally to the ground speed of the sprayer.

The atomizing nozzles for fan type sprayers have always presented a problem in that they either are only effective for a narrow range of output variations or that they show a marked tendency to slow down or completely clog up after some time. The extents of these drawbacks would still be increased with a configuration according to the invention, due to the wide range of liquid output adjustments and variations allowed thereby.

The problem of output variations has been satisfactorily solved in a known nozzle design wherein liquid is fed to the apex of a hollow spinner cone provided with a body rotatably mounted on a fixed shaft and having external spinner blades acted upon by the air blast generated by the fan. However, in practice, such nozzles have shown a marked tendency to slow down or clog up, so that their functioning is somewhat erratic. As applicant has found, this is due to the vacuum created by the injection of liquid, through said shaft to the apex of the spinner cone, said vacuum pulling liquid into the bearing area of said body on said shaft. Holes drilled in the spinner cone, near the apex thereof in order to break the vacuum did not completely solve the problem.

The present invention allows to completely eliminate said drawbacks and thus, to obtain a trouble free nozzle particularly well adapted to the novel sprayer configuration described hereabove. The nozzle according to the invention comprises a hollow spinner cone provided at its apex with an external, cylindrical body carrying spinner blades, said spinner being rotatably carried by a fixed shaft projecting from a support, and a nozzle supply tube located outside of said spinner body, said tube being bent near its free extremity, the latter penetrating into said cone and being located near the apex thereof.

The abovementioned features and advantages of the invention will become more apparent from the following detailed description of one preferred embodiment, reference being made to the appended drawings, wherein:

FIG. 1 schematically illustrates the configuration of the sprayer according to the invention;

FIG. 2 is an enlarged view, partially in axial section, of a nozzle as indicated by $F_2$ in FIG. 1;

FIG. 3 is a view according to line III—III of FIG. 2;

FIG. 4 is a cross section according to line IV—IV in FIG. 1.

As shown in FIG. 1, the sprayer according to the invention comprises an engine 1 driving a fan 2 and a variable capacity hydraulic pump 3, a clutch 4 in the fan drive, allowing to disconnect the fan for road travel or other operations.

Pump 3 feeds a hydraulic motor 5 through conduits 6 and 7, the latter comprising control means 8 to adjust the capacity of pump 3.

The output shaft 9 of motor 5 has a wheel 10 keyed thereto and is connected to the driven or input shaft 11 of an axle assembly 12. Said assembly comprises a differential 13 and drive wheels 14 and 15 for the sprayer. If necessary, shafts 9 and 11 may be coupled via a gear reduction 16.

Wheel 10 drives a wheel 17, through a chain or belt 18, said wheel 17 being keyed to the shaft 19 of a variable capacity pump 20. Preferably the latter will be of the wobble-type, with adjustable wobble-plate. This pump 20 has an inlet conduit 21 connected to a liquid tank (not shown) and an outlet pipe 22 feeding a group of nozzles 23 located in the trajectory of the air blast generated by fan 2. A clutch 24 may be provided to disconnect pump 20 during road travel.

This configuration allows to preset the engine speed to drive the fan at a constant speed, which is essential for good spraying.

Notwithstanding the constant speed of engine 1, the ground speed of the sprayer may be modified by acting on pump 3, through control means 8. The liquid pump 20, will, in any case, be driven proportionally to the ground speed of the sprayer.

As shown in FIGS. 2–4, each nozzle 23 comprises a hollow spinner cone 25 having an external, cylindrical body 26 at its apex. An axial, shouldered bore 27 traverses the cone-body unit. Said body 26 is provided at its periphery with spinner blades 28. The assembly thus far described is rotatably mounted on a shaft 29, extending through the lower part of bore 27 as seen in FIG. 2 and therein supported by a bushing or bearing 30. At both extremities of the latter, retaining and seal rings 31 and 32 are mounted around shaft 29.

The threaded lower extremity of shaft 29 is screwed in a fixed support 33 having a flanged, cup shaped upper part 34 facing said body 26. The upper part of bore 27 is threaded and receives a water-tight plug 35. A nozzle supply tube 36 is connected to a liquid passage 37 provided within support 33, and extends externally of the nozzle assembly. The free end portion of said tube is bent so that it partly penetrates into the cone 25. Said free end is either provided with a calibrated orifice for the passage of liquid or, as shown, has a threaded end to which a "nozzle" 38 is screwed. This construction allows to easily and speedily adapt the nozzles in special cases.

As some of such nozzles 23 are often located one above the other, it might happen that liquid could drip from an upper to a lower nozzle into the space between the body 26 and the cup-shaped part 34 of support 33, and somehow reach the bushing 30 notwithstanding seal 32. To prevent this, the free circular face 39 of body 26 is provided with a series of helical grooves 40, extending from the center of the peripheral edge of said face. In operation, any liquid that might possibly get by the flanged ends of cup-shaped part 34 would be spun out by said grooves, during the rotation of body 26. Vent holes 41 can also be provided in said part 34.

The part of feed tube 36 extending in front of the spinner cone 25 can be aerodynamically profiled, as indicated at 42 in FIGS. 2 and 4.

The upper face 43 of the liquid-tight plug 35 can be either flat or profiled to assist in breaking up the liquid droplets to the desired size. Plug 35 is removed only for disassembly of the shaft bearing, respectively 29 and 30.

It will be appreciated that the embodiment described hereabove presents a quite unique combination of features:
only one engine
selectable, constant fan speed
variable ground speed
liquid supplied in function of each specific application and proportionally to the ground speed
efficient and un-cloggable nozzles, whatever the output of the liquid supply.

Of course, numerous modifications or additions may be brought as specific circumstances dictate to the embodiment described hereabove by way of example only, without departing from the scope of the invention.

What I claim is:

1. An orchard sprayer comprising a wheeled vehicle having at least one drive wheel, an engine mounted on said vehicle, a drive operatively connecting said engine with said drive wheel for driving the wheel at variable speeds, a fan driven by said engine at a constant speed for directing a uniform air blast outwardly from the vehicle towards an area to be sprayed, and a variable capacity spray pump driven by said engine through a drive at speeds proportional to the speed of the drive wheel for feeding metered amounts of liquid to be sprayed into the uniform air blast to provide a uniform dosage upon the area being sprayed.

2. An orchard sprayer as described in claim 1 wherein said drive connecting said engine with said drive wheel is a hydrostatic drive including a variable capacity hydraulic pump driven by the engine, a hydraulic motor driven by fluid fed from said hydraulic pump for driving the drive wheel, and control means for adjusting the capacity of said hydraulic pump so that the operation thereof is independent of the drive to the fan.

3. An orchard sprayer as described in claim 2 wherein said vehicle has a plurality of drive wheels, an axle assembly connected to said drive wheels, a differential within said axle assembly, and a drive shaft within said axle assembly driven by said hydraulic motor.

4. An orchard sprayer as described in claim 3, wherein said axle assembly drive shaft is connected within the drive by which said variable capacity spray pump is driven.

5. An orchard sprayer as described in claim 1 including at least one nozzle connected with said variable capacity spray pump through which liquid is fed into the air blast.

* * * * *